United States Patent
Manfre' et al.

(10) Patent No.: US 7,025,469 B1
(45) Date of Patent: Apr. 11, 2006

(54) VEHICLE REAR-VIEW MIRROR WITH WIDE VIEWING ANGLE AND REDUCED IMAGE DISTORTION

(75) Inventors: Giovanni Manfre', Caldiero (IT); Mario Locatelli, Mozzo (IT)

(73) Assignees: Giovanni Manfre', Caldiero (IT); Mario Locatelli, Mozzo (IT)

( * ) Notice: Subject to any disclaimer, the term of this patent is extended or adjusted under 35 U.S.C. 154(b) by 0 days.

(21) Appl. No.: 09/533,215

(22) Filed: Mar. 23, 2000

(30) Foreign Application Priority Data

Mar. 25, 1999 (IT) .............................. PD99A0062

(51) Int. Cl.
*G02B 5/10* (2006.01)
*B60R 1/06* (2006.01)

(52) U.S. Cl. ...................... 359/868; 359/871
(58) Field of Classification Search .............. 359/512, 359/603, 604, 605, 606, 607, 720, 721, 727, 359/728, 732, 833, 834, 839, 840, 864, 866, 359/868, 869, 871, 872
See application file for complete search history.

(56) References Cited

U.S. PATENT DOCUMENTS

| | | | | |
|---|---|---|---|---|
| 1,869,456 A | * | 8/1932 | Bausch ...................... 359/866 |
| 3,114,910 A | * | 12/1963 | Rymes ....................... 359/869 |
| 4,449,786 A | * | 5/1984 | McCord | |
| 4,715,698 A | * | 12/1987 | Haba ......................... 359/512 |
| 5,005,962 A | * | 4/1991 | Edelmann ................... 359/864 |
| 5,155,625 A | * | 10/1992 | Komatsu et al. ............ 359/512 |
| 5,166,833 A | * | 11/1992 | Shyu .......................... 359/864 |
| 5,207,492 A | * | 5/1993 | Roberts | |
| 5,559,640 A | * | 9/1996 | Vachss et al. | |
| 5,594,585 A | * | 1/1997 | Komatsu ..................... 359/512 |
| 5,610,756 A | * | 3/1997 | Lynam et al. | |
| 5,717,532 A | * | 2/1998 | Chiba et al. ................ 359/868 |
| 5,969,870 A | * | 10/1999 | Jain et al. | |

FOREIGN PATENT DOCUMENTS

| | | | | |
|---|---|---|---|---|
| AU | 0266495 | * | 4/1964 | ................. 359/864 |
| DE | 3415603 | * | 11/1985 | ................. 359/606 |
| DE | 3909395 | * | 6/1990 | ................. 359/606 |
| EP | 0917986 | * | 5/1999 | ................. 359/606 |
| WO | WO 99/62303 | * | 12/1999 | |
| WO | WO 00/58129 | * | 10/2000 | |

* cited by examiner

*Primary Examiner*—Ricky D. Shafer
(74) *Attorney, Agent, or Firm*—Albert Josif; Daniel O'Bryne

(57) ABSTRACT

A mirror with wide viewing angle and reduced image distortion, to be used as an external rear-view mirror for vehicles which is obtained monolithically by pressure injection-molding or gravity casting of a highly transparent material and its external incident surface is flat, while the reflective rear part is obtained by means of an aspheric surface which is generated by the rotation, about an axis which is ideally parallel to the centerline axis of the vehicle, of a curve which determines, with good approximation, a profile which avoids significant deformation of the reflected images.

11 Claims, 4 Drawing Sheets

TREND OF ANGULAR MAGNIFICATION FOR SOME VALUES OF THE DISTANCE E

VEHICLE REAR-VIEW MIRROR WITH WIDE VIEWING ANGLE AND REDUCED IMAGE DISTORTION

BACKGROUND OF THE INVENTION

The present invention relates to a rear-view mirror with a wide viewing angle and reduced image distortion, which is accordingly adapted for external mirror for vehicles.

With a mirror of this type it is possible to achieve a viewing angle of up to 85° without unacceptable distortion of the image. Furthermore, a single uninterrupted image is provided over the entire reflecting surface.

Conventional flat or slightly curved rear-view mirrors for vehicles installed outside the cabin do not allow to have a wide viewing angle, which is usually only approximately 20° or even less.

With a reflecting device of this type the driver is unable to visually detect the presence of, for example, overtaking vehicles, because from a certain point onwards they enter a blind spot which is not covered by the viewing angle of the mirror.

This causes considerable danger, since the driver may be induced to perform maneuvers which he believes to be safe and may instead make him collide with another vehicle which is very close but not visible to him.

In order to obviate this drawback, mirrors have been designed which have differentiated regions providing flat surfaces next to spherical or aspheric surfaces.

The use of these mirrors has encountered many limitations, because the reflected image is reduced and distorted.

In particular, a reduced image does not allow to evaluate the distance of the object being viewed and does not allow to assess its approach speed.

These problems have therefore led to statutory provisions which forbid the use of these mirrors on cars and commercial vehicles unless they are combined with conventional flat mirrors, known as aspheric mirrors.

Such mirrors achieve a maximum viewing angle of 42°, but they provide two different images: a normal one on the flat mirror and a reduced and distorted one in the outermost aspheric part.

In order to obviate this, innovative technologies, such as the use of miniature TV cameras or other concepts such as a prismatic mirror, have recently been developed; they are interesting but complicated and expensive to apply.

SUMMARY OF THE INVENTION

The aim of the present invention is to provide a mirror which eliminates the problems noted in conventional mirrors currently in use.

Within this aim, an object of the invention is to provide a mirror which allows a wide viewing angle particularly to the side of the vehicle on which it is installed.

Another object is to provide a mirror which does not significantly distort reflected images and forms a single image.

Another object is to provide a mirror which allows the driver of the vehicle to have a reliable perception of the distance of the objects that he sees reflected, even if such objects are moving.

Another object is to provide a mirror which is very easy to manufacture and has an accordingly low cost.

This aim, these objects and others which will become apparent from the description that follows are advantageously achieved by a rear-view mirror with wide viewing angle and reduced single-image distortion, particularly for vehicles, characterized in that it comprises a monolithic body made of transparent plastics in which a surface that faces objects to be detected is flat and an opposite reflecting surface is obtained with an aspheric shape whose radius of curvature R is linked, point by point, to a distance E of the eye of a driver of the vehicle and to an angular magnification M, which is determined beforehand, by the formula:

$$M = \frac{1}{j + \frac{2E}{R}}$$

where:

M is the angular magnification of a reflected image;

E is the distance of the eye of the driver or passenger from the surface of the mirror;

R is the optionally variable radius of curvature of a concave mirror in a point of the reflecting surface.

If the mirror is spherical, R is the radius of curvature of the reflecting surface. The angular magnification M, which respectively represents the angles under which the eye of the observer sees the object and the virtual image reflected in the mirror, is a more convenient parameter than the transverse magnification of an optical system represented by:

$$V = \frac{h'}{h}$$

where:

h is the height or other dimension of the object point above the optical axis (positive) or below the axis (negative), in cm;

h' is the height or other dimension of the image points above the axis (negative) or below the axis (positive), in cm.

BRIEF DESCRIPTION OF THE DRAWINGS

Further characteristics and advantages of the invention will become apparent from the detailed description of a preferred embodiment, given by way of non-limitative example and illustrated in the accompanying drawings, wherein.

DESCRIPTION OF THE PREFERRED EMBODIMENTS

Figure 1:
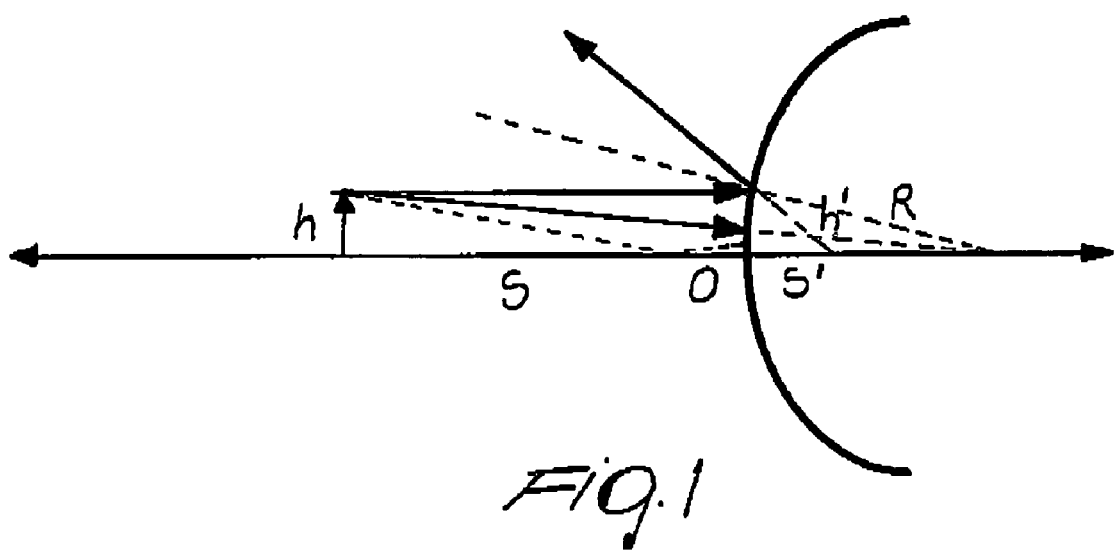
FIG. 1 is a theoretical diagram showing the symbols used in the formulas.
Figure 2:
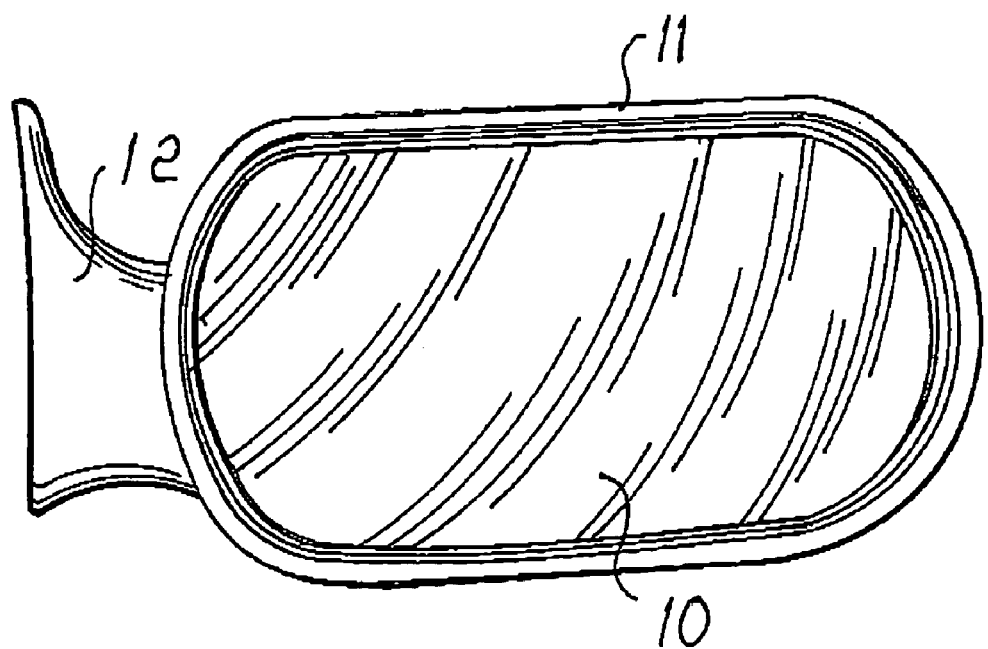
FIG. 2 is a view of a mirror according to the invention.

With reference to the above figures, the mirror according to the invention is shown in an exemplifying embodiment in FIG. 2, where the reflecting part is designated by the reference numeral 10 and is supported by a frame 11 with which a wing 12 is associated which allows its external connection to the structure of the vehicle on which it is to be installed.

Figure 3:
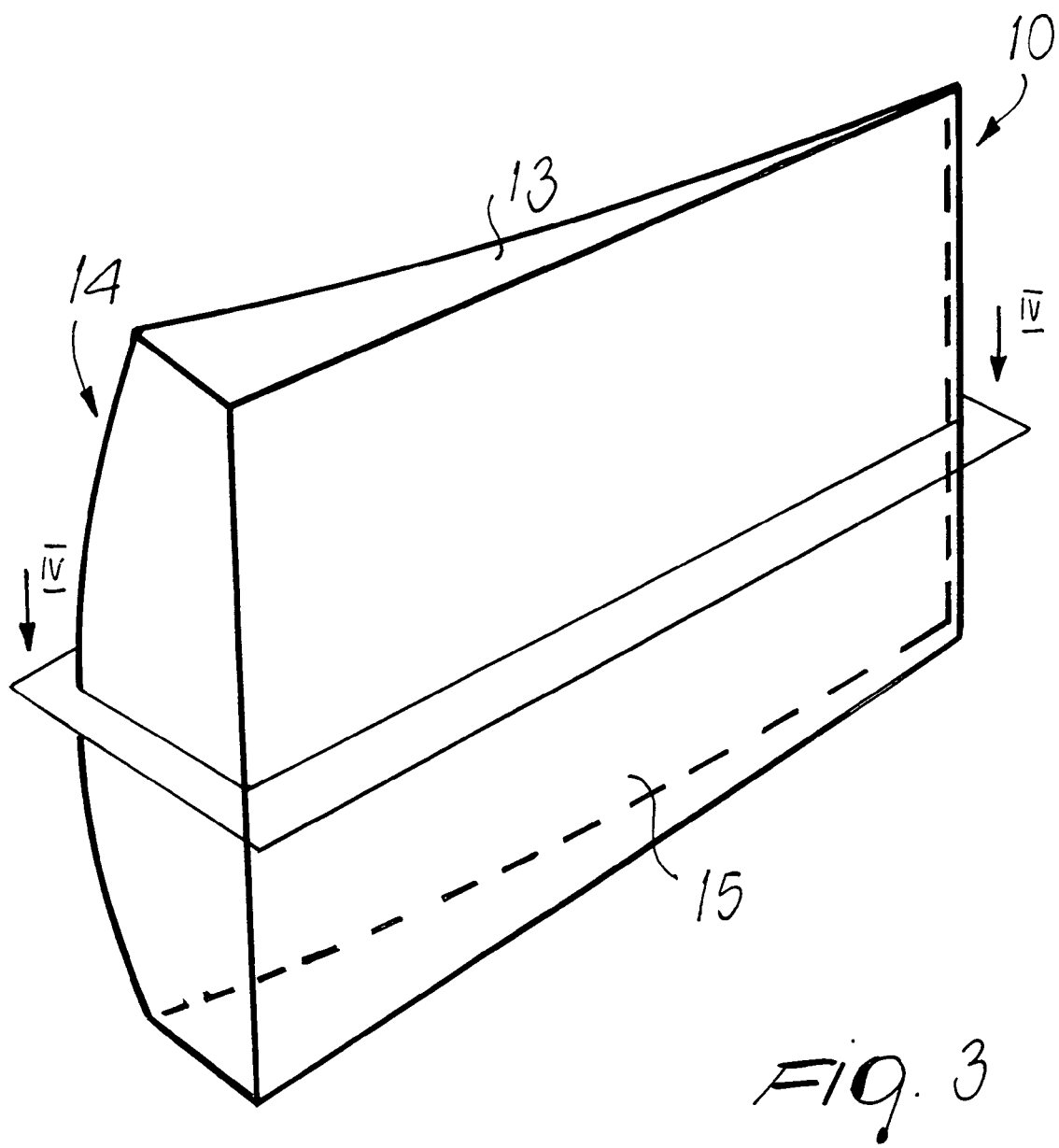
FIG. 3 is a perspective view of the reflecting monolithic body.

The reflecting part 10, except for its perimetric configuration, which is not relevant, is illustrated by way of example in FIG. 3.

As clearly shown, the reflecting part is constituted by a single monolithic block 13 which is made of a transparent plastics by carrying out methods which can be, according to the material used, pressure injection-molding or gravity casting, by means of which extremely low roughness can be achieved, allowing to then provide the reflecting surface by deposition of a metal, such as silver or aluminum or chromium.

The reflecting part 10 can also be the surface of a material (aluminum) in film or panel form which has a very low thickness and is such as to be appropriately embedded in the curved part on the plastic monolithic block during the manufacturing process.

The reflecting surface, designated by the reference numeral 14 in FIG. 3, has a configuration which is obtained theoretically from the rotation of two equations that can be obtained from the remarks that follow and are respectively design-related and purely optical in their scope.

The design-related equation can be obtained as follows:

Given a chosen magnification angle M, as close as possible to 1 (where 1 is taken to correspond to the surface of an equivalent mirror having a flat reflecting surface and equal dimensions), in order to avoid excessively small and distorted images, the general formula that links the various parameters is as follows:

$$M = \frac{\frac{h'}{E+s'}}{\frac{h}{s-E}} = \frac{h'}{h} \cdot \left[\frac{s-E}{s'+E} = \frac{s'}{s} \cdot \frac{s-E}{s'E}\right]$$

$$= \frac{1-\frac{E}{s}}{1+\frac{E}{s'}} = \frac{1-\frac{E}{s}}{1+E\cdot\left(\frac{1}{s}+\frac{2}{R}\right)}$$

$$= \frac{1-\frac{E}{s}}{1+\frac{2E}{R}+\frac{E}{s}}$$

which yields, when simplified:

$$M = \frac{1}{j+\frac{2E}{R}}$$

which is valid when, as actually occurs, the distance E (in cm) between the origin O of the curved mirror and the eye of the observer or vehicle driver is much smaller than the distance S of the observed object.

The parameters of the formula are:

M=magnification angle of the image;

h=height of the object point above the optical axis of the mirror (positive) or below the optical axis (negative), in cm;

h'=height of the image points of the object in the reflecting surface above the optical axis of the mirror (negative) or below the optical axis (positive), in cm;

S=real distance of the object points of the origin O of the mirror (in cm) to the right of the origin;

S'=distance of the virtual image of the origin O of the mirror (to the left), in cm;

R=Radius of curvature of the mirror, which can vary from point to point over part (as in normal "spherical" mirrors) or, as in the invention, all of the reflecting surface of the mirror, in cm.

Figure 6:
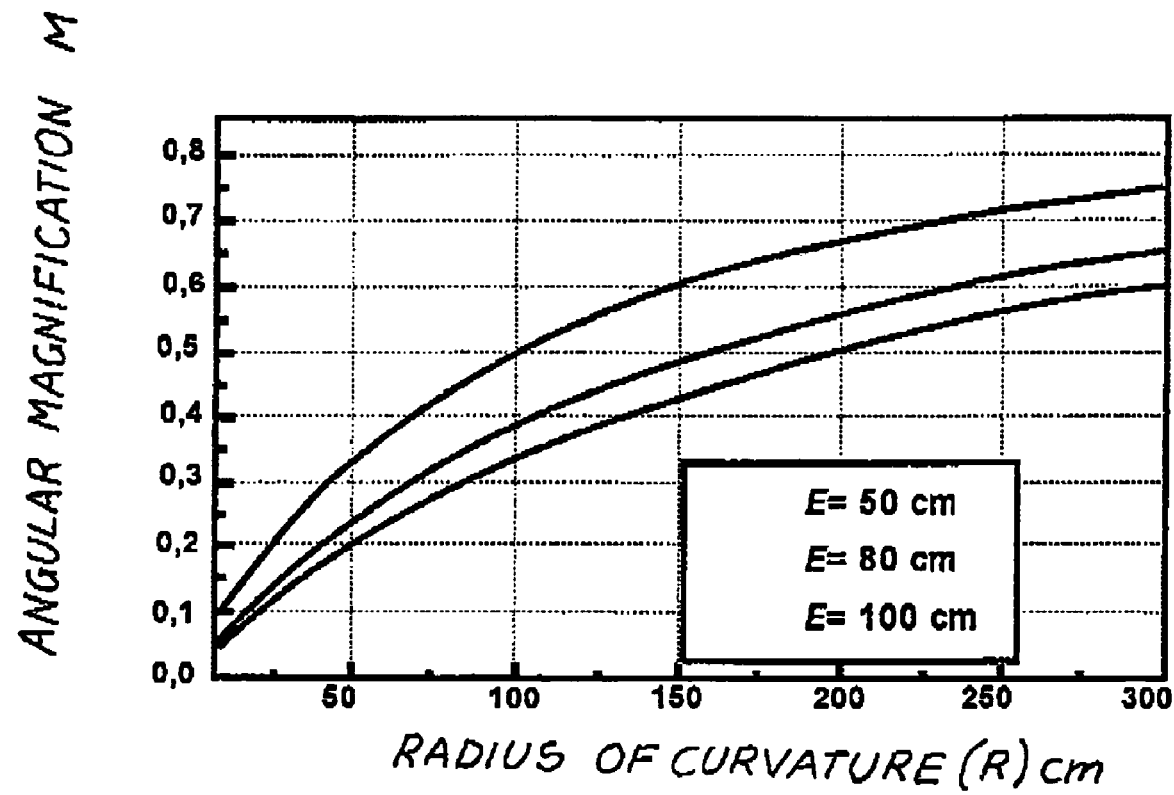
FIG. 6 is a diagram of the angular magnification for a few values of the distance E.

FIG. 6 plots the angular magnification M as a function of the radius of curvature of a spherical mirror for various distances E of the eye of the observer from the mirror.

The distance E of approximately 50 cm relates to the mirror of the driver and the distance E of approximately 100 cm relates to the mirror on the passenger side.

It can be noted that for an equal radius of curvature the magnification related to the driver-side mirror is different from the magnification of the mirror on the passenger side; this drawback will be eliminated by a mirror according to the invention, with a variation of R which allows a blind spot which is adequately much smaller and reduced distortion.

The second equation relates to the point variation of R, which is already known and can be obtained from optical calculations which allow to design the approximate curve, which can be generated by rotation about the axis Z, which is parallel to the median axis of the vehicle, and is:

$$Z = \frac{c(x^2+y^2)}{1+[1-sc^2(x^2+y^2)]^{1/2}} + A(x^2+y^2)$$

X, Y and Z designate the coordinates of the surface 14 of FIG. 3 and the parameters C (curvature factor), S (shape factor), and A (correction factor), which depend empirically on the parameters E and M of the above cited design formula.

The invention allows to design and manufacture a monolithic mirror, on the driver side and on the passenger side, combining the design aspects of the mirror linked to the vehicle with the optical requirements of the reflecting surface in order to have a wide viewing angle and a single image which is not reduced excessively and is not distorted.

Figure 4:
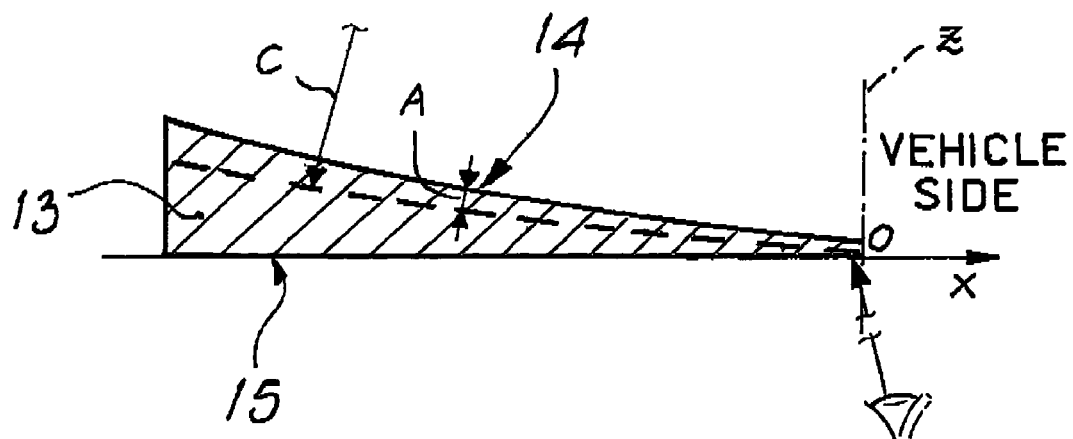
FIG. 4 is a sectional view of the reflecting body, taken along the plane IV—IV of FIG. 3.
Figure 5:
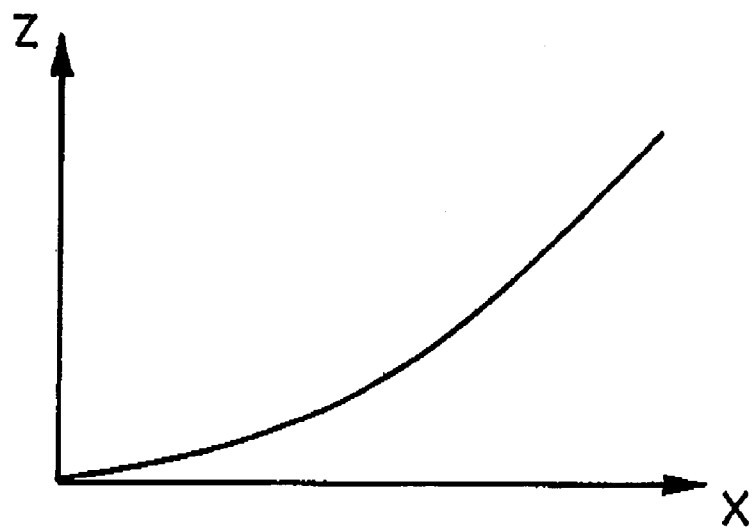
FIG. 5 is a diagram of the curve by means of which the reflecting surface is generated according to a known formula whose parameters depend on E and M, which are set in advance and are related to the design of the car or vehicle.

The reflecting surface 14, as shown in FIG. 4, is achieved by first depositing a leveling coat and then depositing a thin layer of metal which is in turn covered by an anticorrosion coating.

The surface 15 is treated with water-repellent products after being hardened in order to avoid abrasion or scratching problems.

The metallized aspheric surface can constitute the resistive element which, supplied with electric power, allows deicing and/or defogging of the mirror when required.

As an alternative, the resistive coating can be provided in the surface 15 together with the abrasion-resistant and scratch-resistant coating.

The transparent material used in order to obtain the monolithic block can be a polycarbonate, a polymethylmethacrylate or a similar highly transparent plastic material.

It is also possible to use transparent and electrically conducting plastic materials; in this case, by arranging appropriate electrodes it is possible to achieve complete heating of the monolithic block 13 for deicing and/or defogging.

With a mirror of this type it is possible to achieve a viewing angle of up to 85° without excessive or unpleasant distortion of the single image.

For use in a vehicle, it is sufficient to reach an angle of 60°, which allows to have very good rear view.

The advantages of a mirror thus provided are evident.

First of all, blind spots are eliminated, but as a further and important advantage it is possible to eliminate the motorized systems currently used to move the reflecting surface in case of maneuvers when it is necessary to check the position of an obstacle which is normally not visible because it lies in the blind spot.

The elimination of these mechanisms allows to provide a very cheap mirror which is not subjected to malfunctions.

The description and illustrations show that the aim and all the objects have been achieved, providing a mirror with a wide viewing angle.

The reflecting coating can also be provided during the formation of the monolithic body with a molding process which uses an in-mold coating technique or by inserting in the mold a film or a small thin panel which is manufactured separately from the process for manufacturing the transparent monolithic block.

The practical embodiments and the dimensions of the mirror can of course be different, starting from the described and illustrated inventive concept, but functionally equivalent in relation to the characteristics of the vehicles, the positions of the seats, the arrangement of the mirror and the percentile values of the driver (height, leg position, seat back angle, etcetera).

It is also noted that the above description, related to increasing the viewing angle in a horizontal direction, can also be applied vertically by turning the mirror through 90°. This allows, especially when the vehicle is not moving or is parked, to check movements with respect to the obstacles and objects that are present on the ground near the vehicle proximate to its rear part.

The materials used may of course be different though having characteristics of the described type.

The disclosures in Italian Patent Application No. PD99A000062 from which this application claims priority are incorporated herein by reference.

What is claimed is:

1. A rear-view mirror with a wide viewing angle and reduced single-image distortion installed on a vehicle, the mirror comprising a monolithic plastic body which is made of transparent plastic material and has a surface that faces objects to be detected which is flat and an opposite reflecting surface which has an aspheric configuration generated by rotation, about an axis which is parallel to a centerline axis of the vehicle on which the mirror is installed, of a curve whose design equation is:

$$M=1/[1+(2E/R)]$$

wherein M is the angular magnification of a reflected image of the mirror, E is the distance of the eye of a driver from the surface of the mirror that faces objects to be detected, and R is the radius of curvature of the reflecting surface which has a point by point variation over said reflecting surface given by the equation:

$$Z=C(X^2+Y^2)/1+[1-SC^2(X^2+Y^2)]^{1/2}+A(X^2+Y^2)$$

wherein X, Y and Z are coordinates of the reflecting surface and C, S and A are parameters representing, respectively, a curvature factor, a shape factor and a correction factor which depend on the distance E and angular magnification M, said distance E and angular magnification M having values set in relation with the characteristics of the vehicle.

2. The mirror of claim 1, wherein said reflecting surface is fully aspheric.

3. The mirror of claim 2, wherein said aspheric reflecting surface has a transverse viewing angle of 85°.

4. The mirror of claim 1, wherein said monolithic body made of transparent material is a cast body made by way of any of a pressure injection-compression and a gravity casting, and wherein said cast body has a low-roughness surface with a perfectly reflective layer deposited thereon, said reflective layer being any of a metallic deposition layer, a film, and a low-thickness panel.

5. The mirror of claim 4, wherein the reflecting layer is any of a coated layer, an in-mold coated layer, an in-mold embedded reflective panel, and an in-mold embedded film.

6. The mirror as set forth in claim 1 arranged connected externally on a structure of a vehicle.

7. The mirror of claim 1, wherein the flat surface is provided so as to be water-repellent and scratch-resistant.

8. The mirror of claim 1, wherein said mirror is connected externally on the vehicle structure.

9. A rear-view mirror with a wide viewing angle and reduced single-image distortion installed on a vehicle, the mirror comprising a monolithic plastic body which is made of transparent plastic material and has a surface that faces objects to be detected which is flat and an opposite reflecting surface which has an aspheric configuration generated by rotation, about an axis which is perpendicular to a centerline axis of the vehicle on which the mirror is installed, of a curve whose design equation is:

$$M=1/[1+(2E/R)]$$

wherein M is the angular magnification of a reflected image of the mirror, E is the distance of the eye of a driver from the surface of the mirror that faces objects to be detected, and R is the radius of curvature of the reflecting surface which has a point by point variation over said reflecting surface given by the equation:

$$Z=C(X^2+Y^2)/1+[1-SC^2(X^2+Y^2)]^{1/2}+A(X^2+Y^2)$$

wherein X, Y and Z are coordinates of the reflecting surface and C, S and A are parameters representing, respectively, a curvature factor, a shape factor and a correction factor which depend on the distance E and angular magnification M, said distance E and angular magnification M having values set in relation with the characteristics of the vehicle.

10. A rear-view mirror with a wide viewing angle and reduced single-image distortion installed on a vehicle, the mirror comprising a monolithic plastic body which is made of transparent plastic material and has a surface that faces objects to be detected which is flat and an opposite reflecting surface which has an aspheric configuration with a radius of curvature R having a point by point variation over said reflecting surface, said radius of curvature R depending on an angular magnification M of a reflected image of the mirror and to a distance E of the eye of a driver from the reflecting surface according to a design equation which is given by:

$$M=1/[1+(2E/R)]$$

and wherein the point by point variation of the radius of curvature of the reflecting surface R over said reflecting surface is given by the equation:

$$Z=C(X^2+Y^2)/1+[1-SC^2(X^2+Y^2)]^{1/2}+A(X^2+Y^2)$$

wherein X, Y and Z are coordinates of the reflecting surface and C, S and A are parameters representing, respectively, a curvature factor, a shape factor and a correction factor which depend on the distance E and angular magnification M, said distance E and angular magnification M having values set in relation with the characteristics of the vehicle.

11. The mirror of claim 10, wherein said body is made of a material selected from a group comprising polycarbonates and polymethylmethacrylates.

* * * * *